Feb. 3, 1959 R. M. HUBBARD 2,872,533

MAGNETIC AMPLIFIERS

Filed July 12, 1954 6 Sheets-Sheet 1

INVENTOR.
ROBERT M. HUBBARD

BY
Reynolds, Beach & Christensen

ATTORNEYS

INVENTOR.
ROBERT M. HUBBARD
BY
Reynolds, Beach & Christensen
ATTORNEYS

Feb. 3, 1959 R. M. HUBBARD 2,872,533

MAGNETIC AMPLIFIERS

Filed July 12, 1954 6 Sheets-Sheet 3

INVENTOR.
ROBERT M. HUBBARD

BY
Reynolds, Beach & Christensen

ATTORNEYS

INVENTOR.
ROBERT M. HUBBARD
BY
Reynolds, Beach & Christensen
ATTORNEYS

Feb. 3, 1959 R. M. HUBBARD 2,872,533
MAGNETIC AMPLIFIERS
Filed July 12, 1954 6 Sheets-Sheet 5

INVENTOR.
ROBERT M. HUBBARD
BY
Reynolds, Beach & Christensen
ATTORNEYS

Feb. 3, 1959

R. M. HUBBARD 2,872,533

MAGNETIC AMPLIFIERS

Filed July 12, 1954

6 Sheets-Sheet 6

INVENTOR.
ROBERT M. HUBBARD
BY
Reynolds, Beach & Christensen
ATTORNEYS

United States Patent Office 2,872,533

Patented Feb. 3, 1959

2,872,533

MAGNETIC AMPLIFIERS

Robert M. Hubbard, Seattle, Wash., assignor to Boeing Airplane Company, Seattle, Wash., a corporation of Delaware Application July 12, 1954, Serial No. 442,560

11 Claims. (Cl. 179—171)

This invention relates to improvements in magnetic amplifiers of the differential full-wave rectifying self-saturating type wherein the magnitude and sense of the amplifier output current or voltage are caused to vary in accordance with variations in the magnitude and sense of a control signal. The invention is particularly directed to a magnetic differential amplifier of the so-called "operational" type having substantially constant gain throughout its operating range independent of supply voltage and frequency, load impedance, and certain characteristics of amplifier components. The invention is herein illustratively described by reference to presently preferred forms thereof; however, it will be understood that certain modifications and changes in respect to details may be made without departing from the essential features involved.

In many potential applications of magnetic amplifiers such operating requirements as stability, linearity, freedom from drift, and predictability of operation are of prime importance. The first three of these requirements are satisfied to a degree by conventional magnetic amplifier circuits operating with a large amount of negative feedback. The requirement of predictability of operation can be satisfied by amplifier circuits in which positive feedback is used to produce effective substantially infinite internal gain, where a selected amount of negative feedback is applied to the control circuit to limit the actual gain of the amplifier at a predetermined value determined by the amount of resistance inserted in the negative feedback circuit. A magnetic amplifier of this general type is disclosed in certain forms and for certain purposes by Geyger in Communication and Electronics, January 1953, page 383, published by the American Institute of Electrical Engineers. If constructed according to ideal design requirements, an amplifier of this general type is capable of use as an operational element in a wide variety of circuit applications including servo control, signal mixing, impedance changing, gain adjusting, etc. Such magnetic amplifiers may be connected in various types of systems for operational purposes without impairing their accuracy since the input impedance of such amplifiers approaches zero and the gain is virtually independent of load impedance. When designed in a form to produce output voltage as a linear function of input current, the gain of this type of magnetic amplifier is substantially equal to the product of the input current and the negative feedback resistance. When designed in a form to produce output current as a linear function of input current, the gain is the product of the input current and the ratio of the sum of the negative feedback resistance plus the value of a resistance inserted in series with the load to derive the feedback signal, to the latter resistance. In effect, the positive feedback renders negligible such variable factors as rectifier leakage, leakage reactance in the variable magnetic reactance devices and magnetic characteristics of the variable reactance cores, which factors would tend otherwise to decrease the maximum available gain in the amplifier variably in accordance with the degree to which they are present. The addition of negative feedback establishes the gain of the amplifier at a predictable value, which remains substantially constant throughout the load range within the frequency pass band of the amplifier.

It was found when attempting to apply the above principles to actual practice that certain nonlinearities in the operating characteristic of the amplifier occurred unless extraordinary care was taken in selecting perfectly matched cores for the pairs of variable reactance devices used in the circuit. Furthermore, it was found to be very difficult to obtain a characteristic curve which was symmetrical about the mid-point of the differential amplifier characteristic even with substantially perfectly matched ferromagnetic cores, due to mismatch or differences between the core pairs in the opposing sides of the differential circuit. The cost of manufacturing magnetic amplifiers free of distortion from such causes proved to be excessive due to the great care required in the manufacture and choice of components and occasioned investigations which led to the present invention.

An object of the present invention is the provision of a magnetic amplifier of the differential full-wave rectifying type which compensates in relatively simple manner for mismatch between ferromagnetic cores in the pairs of variable reactance devices in each side of the amplifier circuit. A related object is to permit the selection of ferromagnetic cores for the amplifier variable reactances without the requirement that cores which are paired together be closely identical.

Still another object of the invention is to provide an improved magnetic amplifier of the differential operational type in which the problem of matching cores of paired variable reactance elements is solved so that the theoretical benefits of that type of amplifier are now attainable in practice. A related object is a magnetic amplifier of the differential operational type having means automatically compensating for unbalance as between pairs of variable reactance devices in the opposite sides of the differential circuit and thereby improving the symmetry of the characteristic curve of such amplifiers.

In accordance with the invention it has been found that the problem of matching paired cores in any magnetic amplifier circuit of the differential full-wave rectifying type is advantageously solved by providing shunt connections across each of serially connected pairs of amplifier input windings on each side of the amplifier circuit to furnish circulatory paths for currents induced in such windings. For broad purposes it is immaterial whether the paired input windings selected for that purpose comprise the amplifier control windings, bias windings or feedback windings, the term "input winding" being used in a general sense, unless otherwise expressly limited in meaning, to include any winding the energization of which affects the reactance of the related output winding.

In the preferred form of the invention wherein the magnetic amplifier is of the differential operational type the above described shunt connections providing core mismatch compensation are applied to the pairs of bias windings which in turn are energized from the output circuit of the amplifier with the effect of compensating for unbalance or mismatch between the two sides of the differential circuit so as to provide a substantially symmetrical characteristic curve for the complete differential amplifier.

These and other features, objects and advantages of the invention, including certain details of the illustrated embodiments will become more fully evident from the following description by reference to the accompanying drawings.

Figure 1:
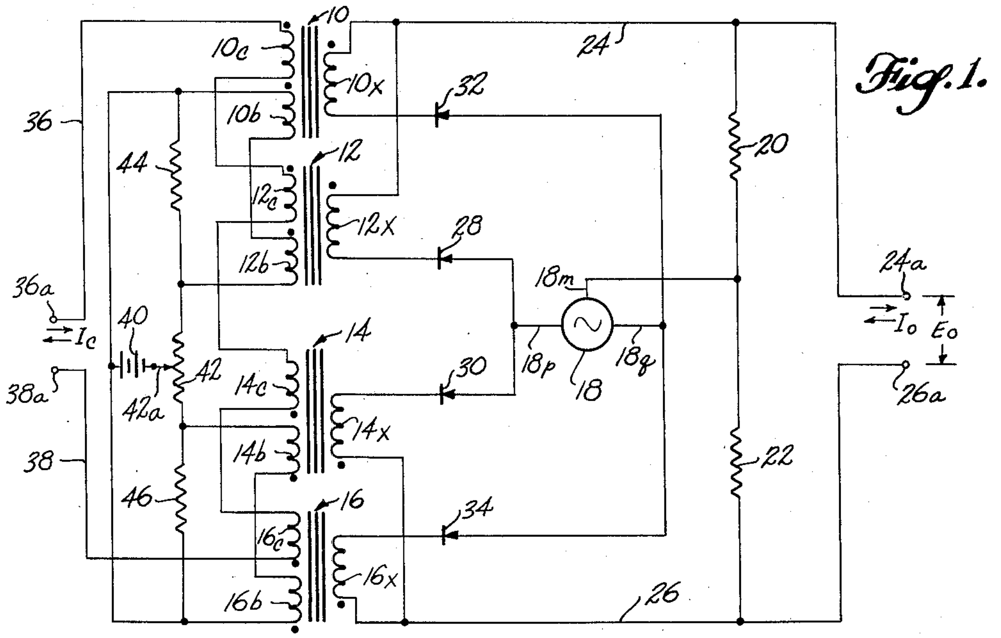
Figure 1 is a schematic diagram of a magnetic amplifier of the differential full-wave rectifying type incorporating shunt connections to provide compensation for mismatch between paired variable reactance device cores.

The magnetic differential amplifier illustrated in Figure 1 is of a generally conventional type except for the novel means compensating for mismatch between the cores of paired variable reactors. The variable reactance devices 10 and 12 are paired together in one side of the differential circuit in opposition to the variable reactance devices 14 and 16 paired together in the opposite side of the differential circuit. These variable reactors have individual control windings 10*c*, 12*c*, 14*c* and 16*c*, respectively, bias windings 10*b*, 12*b*, 14*b* and 16*b*, respectively, and output windings 10*x*, 12*x*, 14*x* and 16*x*, respectively. Each has its own ferromagnetic core which is intended to be identical to or matched with the cores of the other reactors, but in practice it has been found that accurate matching of the cores is very difficult of achievement as mentioned above.

The output or load circuit of the magnetic amplifier shown in Figure 1 comprises the alternating current source 18 having three output conductors, one a mid-tap 18*m* and the remaining two, 18*p* and 18*q*, conductors energized with relatively opposite phasing, or alternating current polarity. The mid-tap 18*m* is regarded as the fixed neutral point, being connected to the mid-point between the voltage divider or mixer comprising equal resistances 20 and 22 which are serially connected between the two output conductors 24 and 26. The latter have terminals 24*a* and 26*a*, between which the load (not shown) may be connected. One side of the alternating current source 18, namely output conductor 18*p*, is connected through a unidirectionally conductive device or rectifier 28 to one end of load winding 12*x* and also through a similar rectifier 30 to the corresponding end of load winding 14*x* on the opposite side of the differential circuit. The opposite sides of these load windings are connected to the respective output conductors 24 and 26. The opposite side of alternating current source 18, namely output conductor 18*q*, is likewise connected through a similar rectifier 32 to one end of the load winding 10*x* and through a similar rectifier 34 to the corresponding end of load winding 16*x*. The opposite ends of these load windings are also connected to the respective output conductors 24 and 26.

Thus the output circuit comprises a full-wave rectifying differential load circuit in which the output terminals 24*a* and 26*a* provide direct voltage of variable magnitude and reversible polarity, depending upon the magnitude and sense of instantaneous differences between average reactances of the pairs of windings 10*x*, 12*x* and 14*x*, 16*x*. Thus if the reactance of the paired load windings 10*x* and 12*x* exceeds that of paired load windings 14*x* and 16*x* the output voltage appearing between terminals 24*a* and 26*a* will have one polarity, whereas if the reverse relationship exists between the reactances of the paired load windings, then the output voltage polarity will be reversed.

The control circuit for the magnetic amplifier illustrated in Figure 1 comprises the input terminals 36*a* and 38*a* arranged for connection to a suitable source of control current Ic. The control circuit conductors 36 and 38 extend from these input terminals to form a circuit loop including all four of the control windings 10*c*, 12*c*, 14*c* and 16*c* in serially connected relationship, with the control windings of each pair being connected in the circuit with like polarity, so that when the control current is zero the reactances of the paired output windings will be balanced and the output voltage Eo will likewise be zero. The usual polarity symbols comprising the dots placed on the diagram adjacent the ends of the reactance windings are used to indicate polarity of such windings in Figure 1 and throughout the remaining circuit diagram figures.

In order to cause the variable reactance devices of this circuit to operate in the linear region of their respective characteristic curves, bias current is passed through the bias windings 10*b*, 12*b*, 14*b* and 16*b*, each pair of bias windings being connected in series relationship across a voltage source 40 to form two separate bias circuit loops. In order to balance accurately the flow of bias current in the two loops against zero error, the return conductor of each loop includes one end portion of the slide wire resistance 42 having an adjustable wiper or tap 42*a* connected to one terminal of the bias voltage source 40, as shown. A resistance 44 is connected in shunt across the serially connected bias windings 10*b* and 12*b* and a similar resistance 46 is likewise connected in shunt across the serially connected bias windings 14*b* and 16*b*. This bias circuit arrangement including the shunt-connected resistances provides automatic compensation for mismatch between the ferromagnetic cores in each pair of variable reactors.

The resistances 44 and 46 are selected to permit circulatory flow of current induced in the bias windings which they shunt while not short-circuiting such windings to flow of normal bias current through them. The circulatory currents referred to are induced in the bias windings by the pulsations of load current flowing through the associated load windings. If, due to core mismatch, more current tends to flow through one load winding than through the load winding paired with it, the circulatory current flowing in the associated bias windings by reason of the shunt connected resistance will produce a reactive effect tending to compensate for the difference. It is found that the novel provision of means providing circulatory paths for induced currents in the paired bias windings or other paired corresponding input windings of a full-wave rectifying differential magnetic amplifier will substantially eliminate any limited amount of core mismatch as a cause of amplifier distortion.

Figure 2:
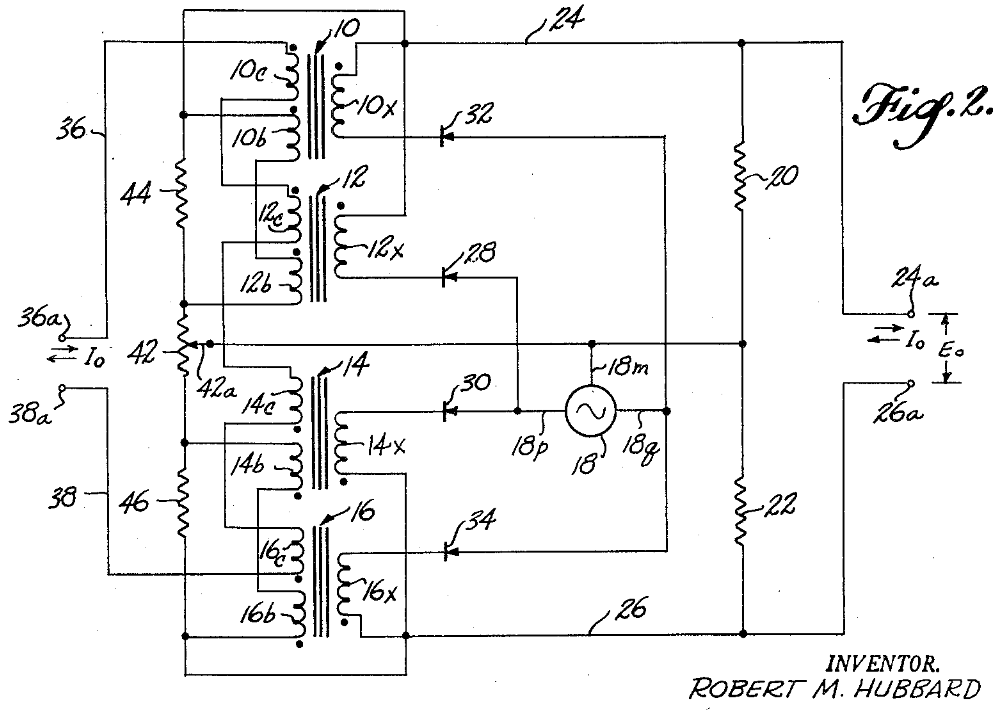
Figure 2 is a schematic diagram of a modified circuit in which energization of the bias windings is derived from the amplifier output circuit.

The circuit shown in Figure 2 incorporates an additional feature of the invention wherein not only is there provided compensation for mismatch between cores paired together in each side of the differential circuit, but there is also included, in combination therewith, a dynamic bias circuit arrangement, having advantages over the static or fixed bias provisions involving the battery or other constant-voltage source as illustrated in Figure 1. This dynamic bias arrangement compensates for unbalance as between opposite sides of the differential circuit, hence virtually eliminates the effects of unbalance between opposite sides of the differential circuit as factors impairing the symmetry of the characteristic curve of the amplifier. With the circuit shown in Figure 1 any material unbalance between opposite sides of the differential circuit will of course cause the amplifier response to control currents of one polarity or sense to differ from its response to currents of the opposite polarity or sense.

In Figure 2 bias voltage for the amplifier bias windings **10*b*, 12*b*, 14*b* and 16*b* is derived directly from the output circuit itself. Preferably these windings are serially connected directly between the amplifier output conductors 24 and 26, as shown. In this case the wiper 42*a* of the slide wire resistance 42 is connected to the reference potential conductor 18*m*, namely the mid-point of the alternating voltage source 18, so as to provide a return for currents flowing from conductor 24 through windings 10*b* and 12*b* and for currents flowing from conductor 26 through windings 14*b* and 16*b*. The setting of the slide wire resistance wiper 42*a*** is adjusted to balance the circuit as before so that substantially equal bias effects are produced in the two sides of the differential circuit.

Figure 3:
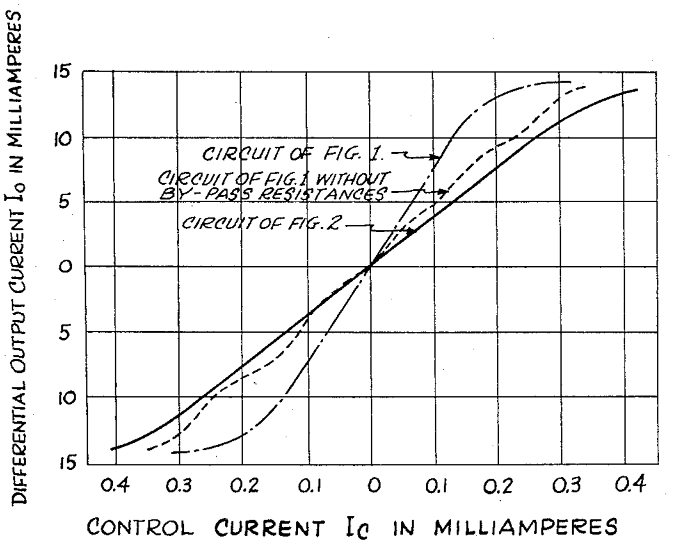
Figure 3 illustrates graphically the improvements obtained by the compensating features of the circuit illustrated in Figure 2.

With the novel bias arrangement illustrated in Figure 2 in conjunction with the core mismatch compensating arrangement comprising the resistors 44 and 46, both types of distortion referred to above are virtually eliminated from the circuit. This observation is borne out by actual tests from which the characteristic curves plotted in the graph of Figure 3 were obtained. Without the by-pass resistances 44 and 46 in the circuit of Figure 1 the characteristic curve of the amplifier illustrated in that figure is as shown by the dotted line in Figure 3. It will be noted that not only is this curve unsymmetrical with respect to the mid-position, but it is by no means a straight line over any substantial portion of its length. When the shunt resistances 44 and 46 providing core mismatch compensation were added to produce the circuit of Figure 1, the greatly improved characteristic curve represented by the dot-dash line in Figure 3 was produced. However, even this improvement failed to provide the desired degree of linearity in the response of the differential circuit, the upper half of the characteristic curve being sloped somewhat differently over at least a material portion of its substantially linear extent than the lower half of the characteristic curve. By connecting the bias windings directly across the output circuit to provide a type of negative feedback bias a linear and substantially symmetrical characteristic curve is produced as shown by the solid line curve representing the characteristic of the circuit of Figure 2. Thus by relatively simple circuit connections it has been found possible to compensate both for core mismatch and for unbalance between opposite sides of the differential circuit.

Figure 4:
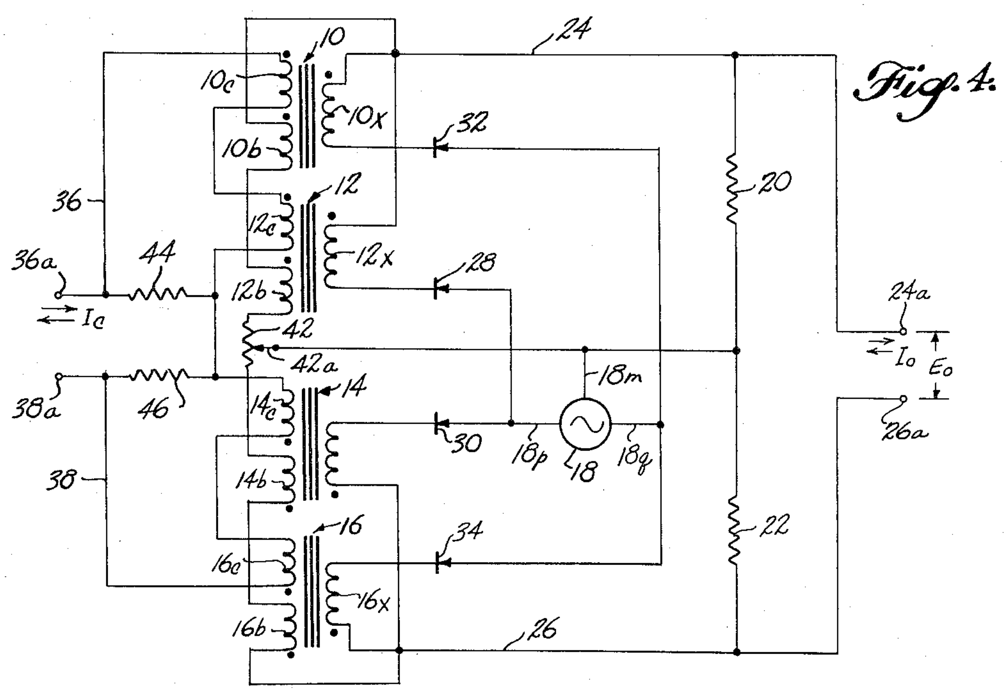
Figure 4 is a schematic diagram of a further modified circuit similar to that shown in Figure 2 with the exception that the shunt connections providing for core mismatch compensation are applied to the control windings as distinguished from the bias windings of the amplifier.

Figure 4 illustrates a modified form of the circuit appearing in Figure 2, the modification comprising the application of the shunt resistance connections to the amplifier control windings as distinguished from the amplifier bias windings. Thus the resistance 44 is connected in shunt to the pair of serially connected control windings **10*c* and 12*c*. Likewise the resistance 46 is connected in shunt to the pair of serially connected control windings 14*c* and 16*c*. The effect of the provision of circulatory current loops for each of paired control windings on each side of the amplifier circuit is the same as in the case of like provisions for the paired bias windings. In either case the effect is substantially to eliminate the effects of mismatch between paired ferromagnetic cores in the respective sides of the differential circuit. In Figure 4, as in Figure 2, the bias windings 10*b*, 12*b*, 14*b* and 16*b* are serially connected directly across the output terminals 24 and 26** to provide dynamic bias to the amplifier compensating for unbalance between opposite sides of the circuit.

Figure 5:
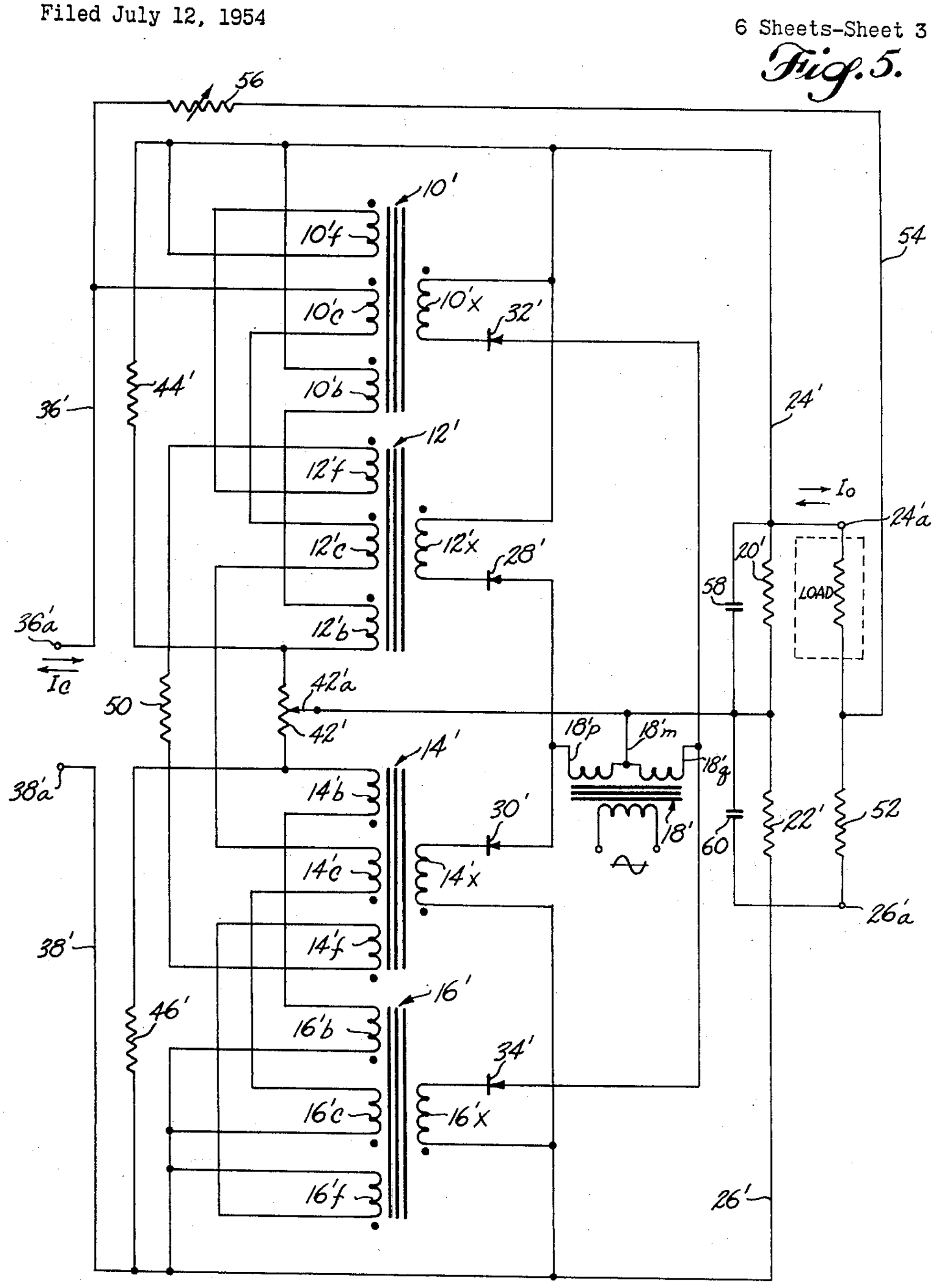
Figure 5 is a schematic diagram of a magnetic amplifier of the differential full-wave rectifying operational type designed for current output, incorporating positive feedback windings and applying negative feedback from the load circuit to the control windings in order to regulate the amplifier load current as a substantially constant multiple of the amplifier input current.

Figure 5 illustrates a preferred embodiment of the inventive principles wherein the magnetic amplifier is of the operational type and is designed to deliver load current bearing a substantially constant relation to control current $I_c$. In this figure the components which correspond to components appearing in preceding figures are identified by corresponding reference numerals with the prime notation. In this case the four variable reactance devices 10′, 12′, 14′ and 16′ have three input windings including, in addition to the control and bias windings previously described, positive feedback windings **10′*f*, 12′*f*, 14′*f* and 16′*f*. These positive feedback windings are serially connected with like polarity across the output conductors 24′ and 26′ with a resistance 50 interposed in the series circuit between the differentially related pairs of feedback windings to limit the positive feedback current flowing through these windings at a value which produces effective substantially infinite internal gain in the amplifier. Negative feedback limiting the actual gain of the amplifier circuit at a predetermined value is derived by inserting a resistance 52 in series with the amplifier load connected across the output terminals 24′*a* and 26′*a*. The negative feedback circuit includes a conductor 54 and feedback resistance 56 connected directly between the junction of the load and resistance 52 and control circuit conductor 36′. Feedback resistance 56** may be a fixed resistance or may be a variable type as illustrated, permitting adjustment of amplifier gain in accordance with the actual resistance setting.

With this type of circuit (Figure 5) as previously mentioned, the amplifier gain, i. e. the ratio of output current $I_o$ to control current $I_c$ is equal substantially to the ratio of the sum of resistances 56 and 52 to the resistance 52. Thus the amplifier gain is a constant and is virtually independent of internal factors which otherwise tend to impair the linearity of response, except as to those particular factors with which the present invention is primarily concerned. Those factors which still impair the linearity of response of an operational amplifier of the differential type, as illustrated in Figure 5, are eliminated or overcome by the novel combination of circuit techniques discussed in connection with the preceding figures. In this instance the shunt resistance connections compensating for mismatch of paired ferromagnetic cores are applied to the bias windings in respectively opposite sides of the differential circuit. Thus the compensating resistance 44′ is connected directly across the series-connected bias windings **10′*b* and 12′*b*, whereas the compensating resistance 46′ is connected directly across the series-connected bias windings 14′*b* and 16′*b*, as shown. Furthermore, these bias windings are serially connected across the output conductors 24′ and 26′ with a circuit balancing slide wire resistance 42′ interposed between the pairs of bias windings and with the wiper 42′*a* of this resistance connected to the mid-tap of the alternating current source which is illustrated as comprising a power transformer 18′** having a center-tapped secondary. As a result of these provisions, it becomes possible in practice to realize the theoretical benefits in terms of linearity of response of the full-wave rectifying differential operational type amplifier.

Condensers 58 and 60 shunted across the respective voltage dividing or mixing resistances 20′ and 22′ improve the symmetry of the amplifier characteristic in response to rise and decay transients and tend to improve the linearity of the static transfer characteristic of the circuit.

The particular circuit illustrated in Figure 5 was devised to control the operation of a hydraulic valve in an airborne servo control system, the load shown in the diagram representing the control windings of an electro-hydraulic control valve. Probably the most difficult problem of that application was to provide control current to these control windings varied as a direct function of input current regardless of temperature variations to which the valve windings were subjected in their operating environment. Most servo amplifiers are affected by changes in load impedance. However, with the present circuit it was found that the circuit delivered load current to these windings which remained at a substantially constant ratio to the control current $I_c$ despite changes in load resistance.

The following design data are listed for the circuit illustrated in Figure 5, which was designed for the particular application mentioned above, this data being representative only:

| | |
|---|---|
| 1. Variable reactance cores | "Hy Mu 80" 0.001" tape-wound toroids, ½" x ¾" x ⅛". |
| 2. Variable reactor windings | Load winding 600 turns No. 36 wire.<br>Control winding 400 turns No. 36 wire.<br>Feedback windings 100 turns No. 36 wire.<br>Bias winding 100 turns No. 36 wire. |
| 3. Transformer core | "Hipernik V" 0.002" tape-wound toroid, ⅝" x ¾" x 3/16". |
| 4. Transformer windings | Primary winding 400 turns No. 34 wire.<br>Secondary winding 1400 turns No. 34 wire, center-tapped. |
| 5. Rectifiers | One cell selenium, 30 milliamperes rated Westinghouse 12G11KE1C. |
| 6. Resistance **56** | 1330 ohms or other value depending on gain desired. |
| 7. Resistances **44'** and **46'** | 180 ohms each. |
| 8. Resistance **50** | 4,000 ohms. |
| 9. Resistance **42'** | 6,500 ohms. |
| 10. Resistances **20'** and **22'** | 220 ohms each. |
| 11. Load resistance | Nominally 500 ohms. |
| 12. Resistance **52** | 100 ohms. |
| 13. Condensers **58** and **60** | 2 microfarads each. |
| 14. Voltage applied to transformer primary | 10 volts, 900 cycles per second. |

Although the gain of this circuit is independent of the number of control winding turns or coils, it is desirable, in the interest of obtaining maximum linearity in the circuit, to use as many turns as the required response time will permit. In this way the equations mentioned above theoretically defining the transfer characteristics of the amplifier become more nearly realized in practice and there is the further advantage of improved stability in the circuit due to the maximum effects gained from negative feedback current.

Figure 6:
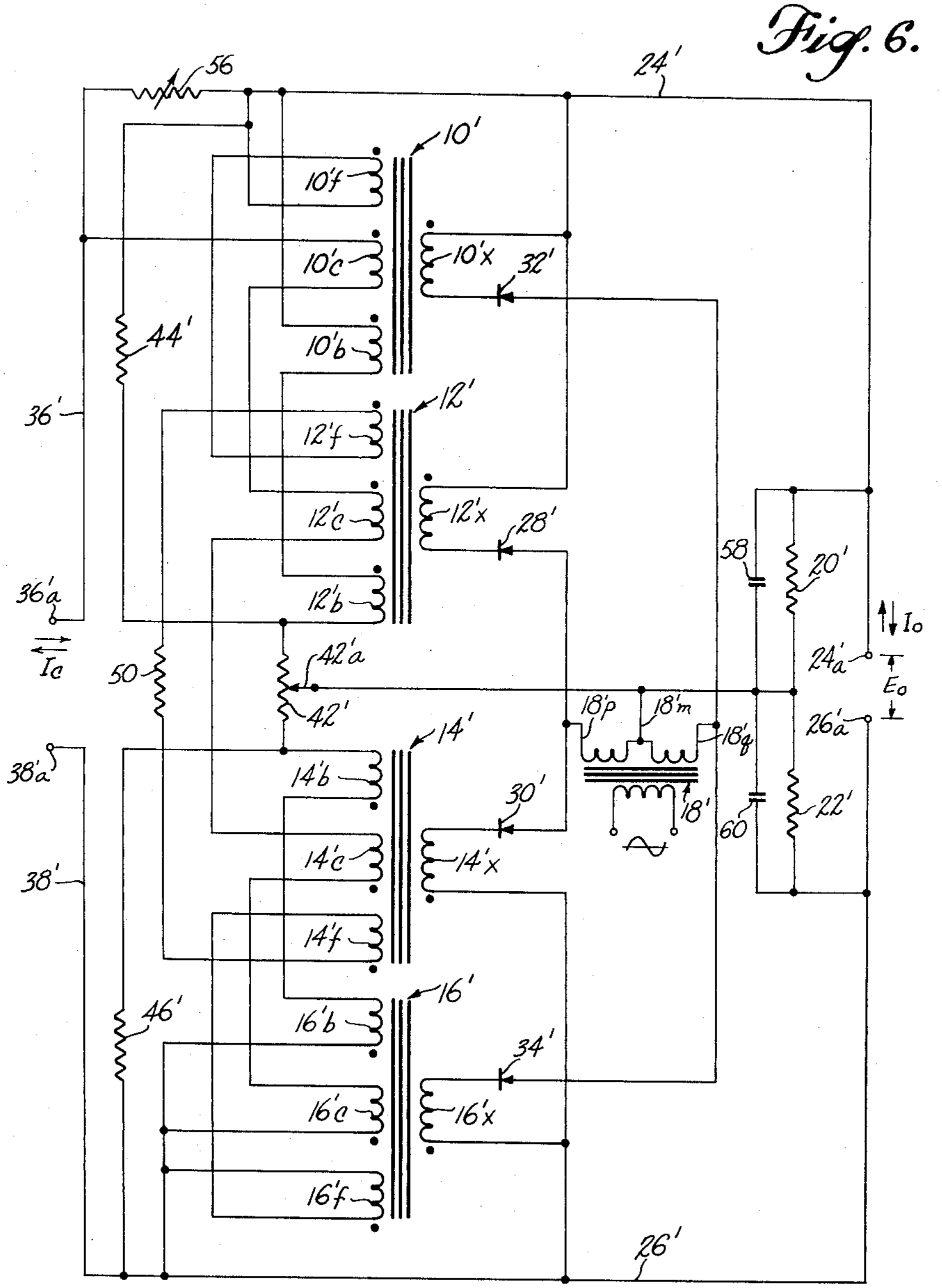
Figure 6 is a schematic diagram of a magnetic amplifier of the differential full-wave rectifying operational type similar to the circuit shown in Figure 5, but modified to the extent necessary to product a voltage output as distinguished from a current output, core mismatch compensating connections in the circuit being applied to bias windings.

Figure 6 illustrates a modification of Figure 5 wherein the novel amplifier characteristics are applied to provide an output voltage which is substantially equal to the product of the control current and the feedback resistance 56. This is a simpler circuit than that of Figure 5 in that the resistance 52 is not required.

Figure 7:
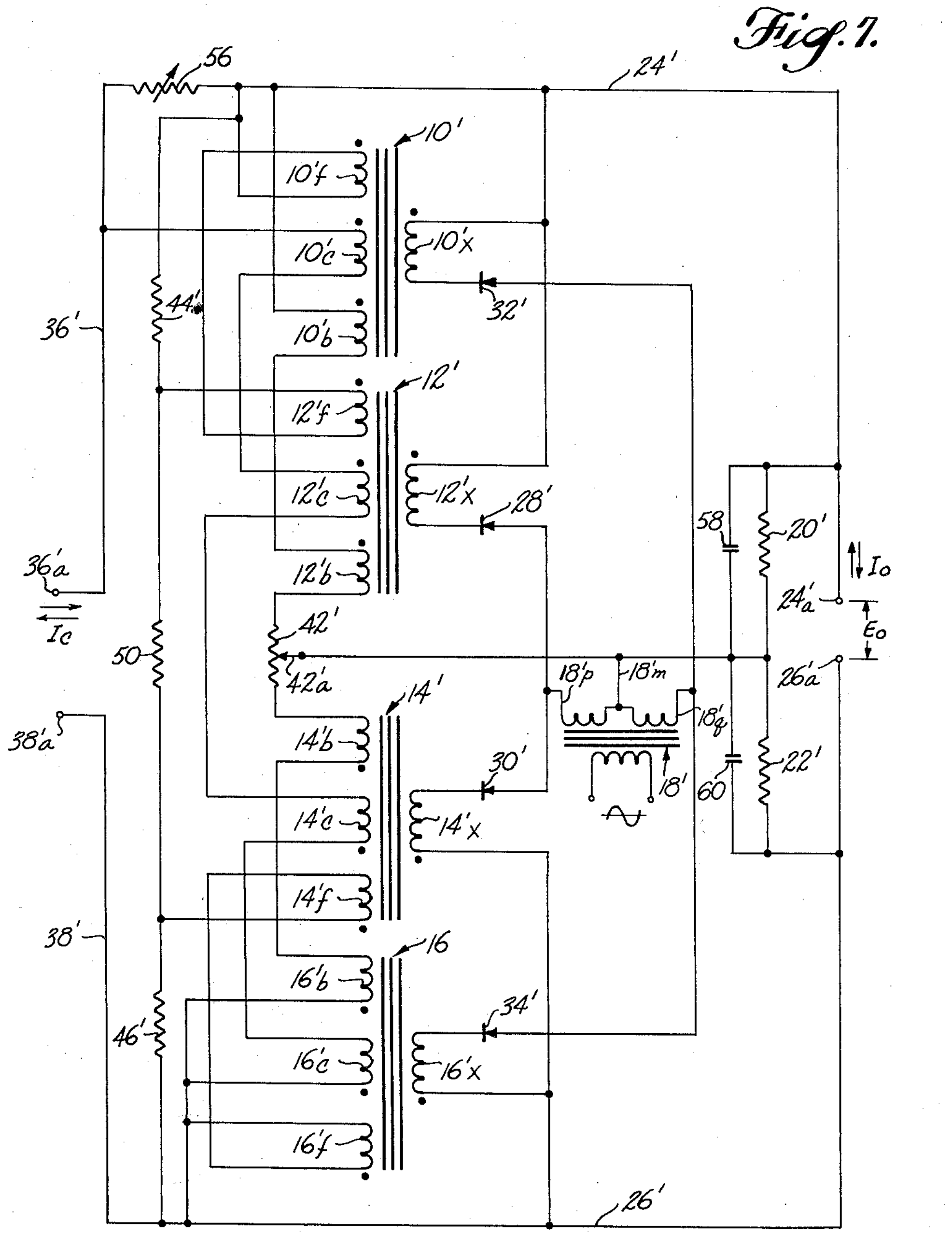
Figure 7 is a modification of Figure 6, in which connections providing compensation for core mismatch are applied to the positive feedback windings of the circuit.

Figure 7 illustrates a modification of Figure 6 wherein the core mismatch compensating shunt resistances 44' and 46' are applied not to the amplifier bias windings but to the positive feedback windings. The same end results are achieved in either case. If the positive feedback windings in Figure 7 have the same number of turns as the bias windings in the particular circuit of Figure 6, then the size of the resistances 44' and 46' may be the same in this case as in Figure 6. In general it is found that these resistors should each be selected to have a resistance which is from one-half to one times the square of the ratio of shunted turns to output turns, times the unsaturated (maximum) reactance of the output winding calculated at the carrier frequency used in the system, the term "shunted turns" having reference to an input winding such as 10'f, and the term "output turns" having reference to the corresponding output winding such as 10'x. This is true generally in all forms of the circuit in which the core mismatch compensating shunt resistances are connected across paired windings.

Figure 8:
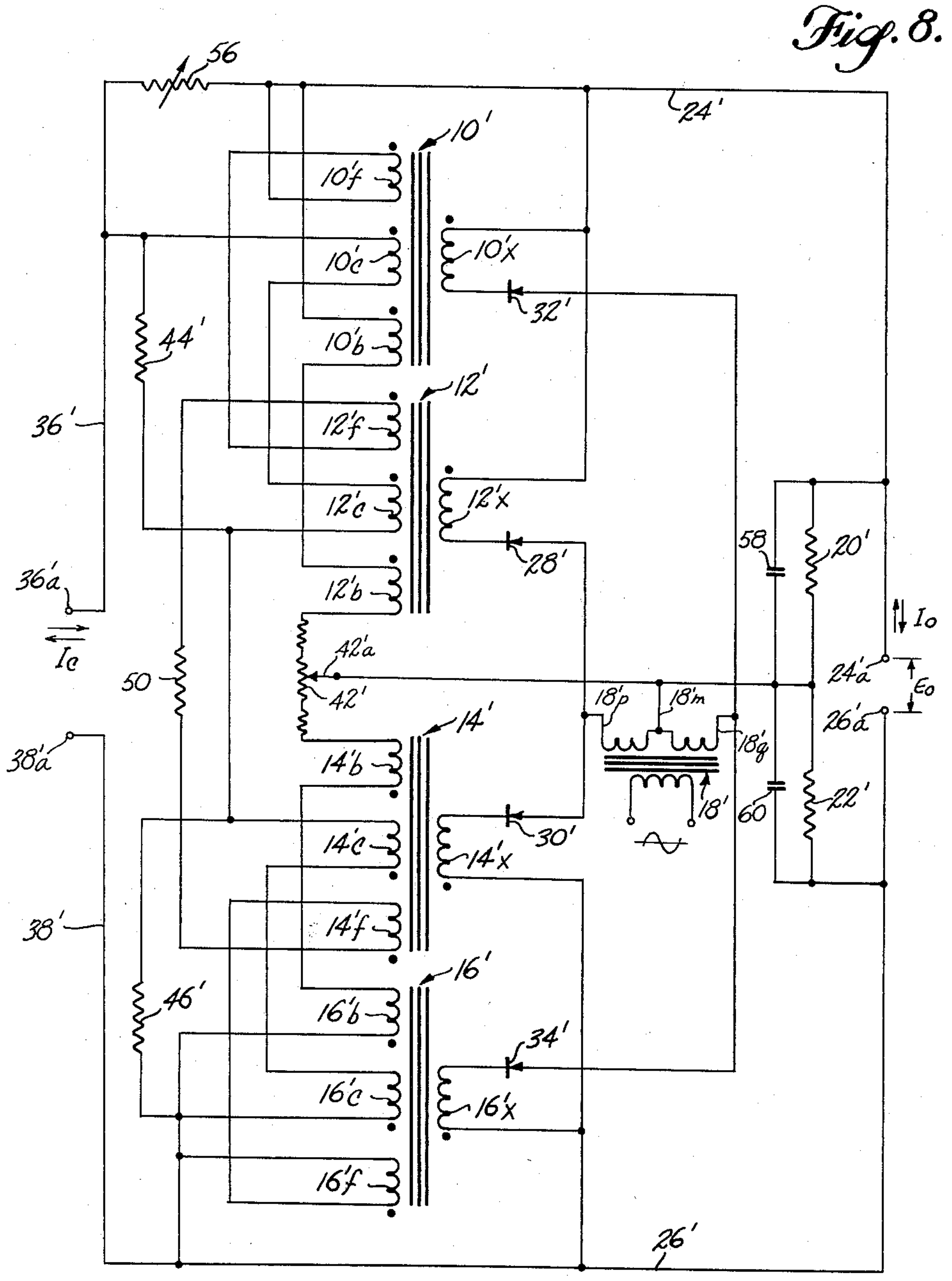
Figure 8 is another modification of Figure 6 in which the connections providing compensation for core mismatch are applied to the control windings of such amplifier.

In the modified arrangement of Figure 8 the core mismatch compensating resistance connections are applied to the control windings in the respective sides of the differential circuit and similar results are achieved to those realized from the circuits of Figures 6 and 7.

It will be seen from a comparison of Figures 6, 7 and 8 that the desired compensation for mismatch of paired variable reactance cores may be achieved by applying the described shunt connections to any of corresponding pairs of amplifier input windings within the meaning of that term as previously defined herein.

It will be appreciated that the design requirements of particular applications will vary and that the circuit constants will likewise vary. Moreover, it will be evident that the teachings of the invention may be applied in different forms of differential circuits of the full-wave rectifying type within the scope of the appended claims defining this invention.

I claim as my invention:

1. In a magnetic amplifier of the differential full-wave rectifying type, the combination comprising two pairs of variable reactance devices, each such device including a ferromagnetic core, an input winding and an output winding; an output circuit including a source of alternating current having a point of substantially fixed potential intermediate the potentials of opposite sides of said source, opposing output conductors, rectifier elements individual to the respective output windings, and means connecting each of said output windings in series with its associated rectifier element, with the output windings and associated rectifier elements of one pair being connected with like polarity between one output conductor and respectively opposite sides of said source, and with the output windings and associated rectifier elements of the second pair being similarly connected with the same polarity as the first pair between the other output conductor and respectively opposite sides of said source; input circuit means including a source of input voltage, means connecting said input voltage source to the input windings of one pair in series relationship with like polarity of such windings, means connecting said input voltage source to the input windings of the second pair in series relationship with opposite polarity relative to the first-mentioned pair of input windings, and core mismatch compensating means comprising a first electrical impedance element connected between the relatively opposite sides of one such pair of input windings, and a similar electrical impedance element connected between the relatively opposite sides of the other pair of input windings, said impedance elements providing paths for flow of circulatory currents induced in the respective pairs of input windings and having values of impedance reflected in the output windings of said variable reactance devices producing substantially complete cancellation of amplifier gain nonlinearities caused by mismatch of cores of the respective variable reactance devices of each pair; and control circuit means operatively connected to said variable reactance devices to vary the reactance of the pairs of output windings differentially in either sense in accordance with the magnitude and sense of a control signal applied to said control circuit means.

2. The magnetic amplifier defined in claim 1, wherein the input voltage source comprises the output circuit, the two pairs of input windings being connected between the opposing output conductors in the output circuit, and wherein the variable reactance devices have separate control windings additional to the input windings thereof and connected in the control circuit.

3. The magnetic amplifier defined in claim 2, wherein the variable reactance devices have separate positive feedback windings additional to their input and control windings, circuit means connecting said positive feedback windings across the opposing output conductors of the output circuit to produce effective substantially infinite internal gain in said magnetic amplifier, and gain-limiting resistance means interposed between the control winding and at least one of said output conductors to apply negative feedback limiting the actual gain of said magnetic amplifier at a predetermined value determined by the size of such resistance.

4. In a magnetic amplifier of the differential full-wave rectifying type, the combination comprising two pairs of variable reactance devices, each such device including a ferromagnetic core, a control winding, a positive feedback winding, a bias winding and an output winding; an output circuit including a source of alternating current having a point of substantially fixed potential intermediate the potentials of opposite sides of said source, opposing output conductors, rectifier elements individual to the respective output windings, and means connecting each of said output windings in series with its associated rectifier element, with the output windings and associated rectifier elements of one pair being connected with like polarity between one output conductor and respectively opposite sides of said source and with the output windings and associated rectifier elements of the second pair being similarly connected with the same polarity as the first pair between the other output conductor and respectively opposite sides of said source; input circuit means including means connected to said output conductors for deriving a voltage which varies in direct proportion to the voltage between said output conductors and means connected for applying such derived voltage to the bias windings of one pair connected in series relationship with like polarity of such windings, and means connected to said output conductors for deriving a voltage which varies in direct proportion to the voltage between said output conductors and connected for applying such latter derived voltage to the bias windings of the second pair in series relationship with opposite polarity relative to the application of the derived voltage applied to the first-mentioned pair of input windings; control circuit means subjecting the pairs of control windings to a control signal with relatively opposite polarity of one pair relative to the other pair; circuit means applying positive feedback voltage from said output conductors to the pairs of positive feedback windings with relatively opposite polarity of one pair relative to the other pair to produce effective substantially infinite internal gain in said magnetic amplifier; and gain-limiting resistance means interposed between the control windings and at least one of said output conductors to apply negative feedback limiting the actual gain of said magnetic amplifier at a predetermined value determined by the size of such resistance.

5. In a magnetic amplifier having two pairs of substantially similar variable reactance devices each including a separate ferromagnetic core, and input and output windings, opposing output conductors, a source of alternating voltage having a fixed neutral potential point, and circuit means including rectifier elements applying to one output conductor through the two output windings of one pair rectified potential of one polarity from respectively opposite sides of said source, and applying to the other output conductor through the two output windings of the other pair rectified potential of the same polarity from respectively opposite sides of said source, whereby the voltage between said output conductors may vary in either sense from zero in accordance with variations in the differential reactances of the pairs of output windings; the combination of control means energizable to vary the magnetization of said pairs of cores differentially in either sense in accordance with the magnitude and sense of a control signal applied to said means; and means substantially compensating for any core mismatch between variable reactance devices in the respective pairs including a first circuit means forming a closed circuit loop including the two input windings of one pair connected in series relationship with like polarity, and a second circuit means forming a closed circuit loop including the two input windings of the other pair connected in series relationship with like polarity, said closed circuit loops having predetermined values of impedance whereby induced circulatory currents permitted to flow in said pairs of input windings materially improve the linearity of response of said magnetic amplifier to variations in strength of control signal, said impedance values being approximately equal to the square of the ratio of input winding turns to output winding turns, multiplied by the unsaturated or maximum reactance of the output winding.

6. The magnetic amplifier defined in claim 5, wherein the control means comprise the two pairs of input windings serving as control windings, and means for passing control current through said two pairs of input windings with relatively opposite polarity of one pair relative to the other pair.

7. The magnetic amplifier defined in claim 6, wherein the four variable reactance devices each have a second input winding, and circuit means passing bias current through the pairs of said second input windings proportional to the amplified output of said magnetic amplifier with the polarity of one pair of such windings being opposite to that of the other pair thereof.

8. The magnetic amplifier defined in claim 7, wherein the four variable reactance devices each have a third input winding, and circuit means passing positive feedback current through the pairs of said third input windings from the output conductors of said amplifier, including resistance means establishing the flow of such positive feedback current at a value producing effective substantially infinite internal gain in said amplifier, and gain-limiting negative feedback circuit means including a feedback resistance connected between one of said output conductors and the first mentioned input windings serving as the control windings of said amplifier, whereby the gain of said amplifier is substantially proportional to the negative feedback resistance.

9. In a magnetic amplifier having two pairs of substantially similar variable reactance devices each including a separate ferromagnetic core, and input and output windings, opposing output conductors connected to a load having predetermined reactance characteristics, a source of alternating voltage having a fixed neutral potential point, and circuit means including rectifier elements applying to one output conductor through the two output windings of one pair rectified potential of one polarity from respectively opposite sides of said source, and applying to the other output conductor through the two output windings of the other pair rectified potential of the same polarity from respectively opposite sides of said source, whereby the voltage between said output conductors may vary in either sense from zero in accordance with variations in the differential reactances of the pairs of output windings; the combination of control means energizable by a control signal having frequency components contained substantially within a predetermined range, to vary the magnetization of said pairs of cores differentially in either sense in accordance with the magnitude and sense of control signals applied to said means; and means substantially compensating for any core mismatch between variable reactance devices in the respective pairs including a first resistance element forming a closed circuit loop including the two input windings of one pair connected in series relationship with like polarity, and a second resistance element forming a closed circuit loop including the two input windings of the other pair connected in series relationship with like polarity, said resistance elements being of predetermined size permitting induced circulatory currents to flow in said pairs of input windings of respective values substantially nullifying the effects of such core mismatch on the linearity of response of said magnetic amplifier to variations in strength of control signal, said first and second resistance elements each having a resistance of the order of from one-half to one times the square of the ratio of input winding turns to output winding turns, times the unsaturated or maximum reactance of the output winding.

10. A magnetic amplifier comprising two pairs of variable reactance devices each including a separate ferromagnetic core, an output winding, and at least one input winding, load circuit means including said two pairs of output windings and comprising a differential full-wave rectifying circuit arrangement wherein the magnitude and sense of load current varies in accordance with differential reactances of said pairs of output windings, control circuit means energizable to vary the magnetization of said pairs of ferromagnetic cores differentially in accordance with the magnitude and sense of a control signal applied to said control circuit means, and means compensating for mismatch between the variable reactance devices of each pair, including separate circuit means connected to the respective pairs of input windings furnishing separate paths for flow of induced circulatory currents through the members of each pair of input windings connected in series with each other and independently of induced circulatory currents flowing in the other pair of such input windings, said circuit means having values of resistance to flow of induced currents in said separate paths approximately equal to the reflected impedances of the respective output windings in the unsaturated condition of such cores.

11. A magnetic amplifier comprising two pairs of variable reactance devices each including a separate ferromagnetic core, an output winding, a control winding and a bias winding, load circuit means including said two pairs of output windings and comprising a differential full-wave rectifying circuit arrangement wherein the magnitude and sense of load current varies in accordance with differential reactances of said pairs of output windings, control circuit means including said control windings energizable to vary the magnetization of said pairs of ferromagnetic cores differentially in accordance with the magnitude and sense of a control signal applied to said control circuit means, bias circuit means including said bias windings connected for energization by output voltage from said amplifier means to vary the magnetization of said cores differentially to predetermined operating points, and means compensating for mismatch between the variable reactance devices of each pair, including circuit means connected to the respective pairs of bias windings furnishing separate paths for flow of induced circulatory currents through the members of each pair of bias windings connected in series with each other and independently of induced circulatory currents flowing in the other pair of such bias windings, said separate paths having values of resistance approximately equal to the reflected reactances of the respective output windings in the unsaturated condition of said cores.

References Cited in the file of this patent

UNITED STATES PATENTS

| | | |
|---|---|---|
| 2,475,575 | Tweedy | July 5, 1949 |
| 2,632,145 | Sikorra | Mar. 17, 1953 |
| 2,677,099 | Rau | Apr. 27, 1954 |
| 2,683,857 | Bradley | July 13, 1954 |
| 2,700,130 | Geyger | Jan. 18, 1955 |
| 2,723,373 | Steinitz | Nov. 8, 1955 |
| 2,730,574 | Belsey | Jan. 10, 1956 |